United States Patent Office 3,435,072
Patented Mar. 25, 1969

3,435,072
CYCLOHEXENEIMINE THIOCYANATES
Guglielmo Kabas, Binningen, Switzerland, assignor to W. R. Grace & Co., New York, N.Y., a corporation of Connecticut
No Drawing. Filed June 14, 1966, Ser. No. 557,360
Int. Cl. C07c 161/02
U.S. Cl. 260—566
6 Claims

ABSTRACT OF THE DISCLOSURE

The invention provides, as new compounds having herbicidal activity an imine thiocyanate of the formula

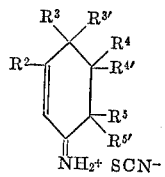

wherein $R^2$ is selected from the group consisting of methyl and phenyl; $R^3$ is hydrogen; and $R^2$ and $R^3$ together are tetramethylene; $R^{3\prime}$, $R^4$ and $R^{4\prime}$ are selected from the group consisting of hydrogen and methyl; and $R^5$ and $R^{5\prime}$ are hydrogen.

---

This invention relates to organic thiocyanates, their preparation, and herbicidal compositions containing them.

The invention provides, as new compounds having herbitical activity, the cyclic unsaturated imine cyanates of formula:

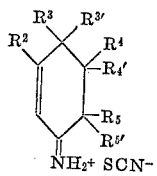

where $R^2$ is alkyl or alkenyl of 1 to 4 carbon atoms or phenyl, $R^3$, $R^{3\prime}$, $R^4$, $R^{4\prime}$, $R^5$ and $R^{5\prime}$ are each hydrogen, alkyl or alkenyl of 1 to 4 carbon atoms, or phenyl, and $R^2$ and $R^3$, $R^{3\prime}$ and $R^4$, or $R^{4\prime}$ and $R^5$ may together represent a bridge formed by a tri- or tetramethylene chain. Preferred compounds are those in which $R^2$ is methyl or phenyl, $R^3$ is hydrogen, or $R^2$ and $R^3$ together are tetramethylene, $R^{3\prime}$, $R^4$ and $R^{4\prime}$ are each hydrogen or methyl, and $R^5$ and $R^{5\prime}$ are hydrogen.

According to a feature of the invention, the aforesaid new thiocyanates are prepared by reacting together a ketone of formula:

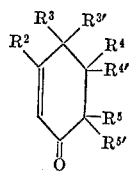

wherein the various symbols are as hereinbefore defined, with ammonium thiocyanate, preferably in an inert, water-immiscible, nonpolar, organic solvent at 50–150° C.

and in the presence of an alkali or alkaline earth metal (especially sodium) salt of an inorganic acid, e.g., disodium hydrogen orthophosphate, trisodium orthophosphate, sodium chloride, or sodium sulphate. Ordinarily the ketone and thiocyanate are reacted in approximately equimolecular (i.e., stoichiometric) proportions, though to ensure that all the ketone reacts, it is preferred to use a small excess, up to say 1.1 molecular proportions of the thiocyanate. The proportions of the salt is not critical but it is generally convenient to use 0.5 to 5%, say 2% of the weight of the ketone. The water formed during the reaction is preferably removed as it is formed by azeotropic distillation, with the inert solvent which is preferably one forming an azeotrope with water, for example benzene, toluene, or xylene, and the product may be isolated and recrystallized in conventional manner.

The invention includes within its scope herbicidal compositions comprising one or more compounds or Formula I in association with a compatible diluent. Such a diluent may be, for example, water or a solid or semi-solid, e.g., a powdered clay or other solid suitable for direct application to soil to be treated. The compositions preferably also contain a wetting or dispersing agent. The proportion of the compound of Formula I is chosen having regard to the method of application, the nature of the soil and weed infestation to be treated, and the effect sought. Ordinarily the compositions themselves will contain from 0.01% by weight up to as high as 50% by weight when concentrates are made for dilution at the time of use. The rate of application, calculated as active substance, will generally be from 0.1 to 10 pounds per acre.

The following examples illustrate the invention. Unless otherwise specified all parts and percentages are by weight.

Example I

Isophorone (276 g., 2 moles) and ammonium thiocyanate (152 g., 2 moles) were heated together in the presence of 100 ml. of toluene at the reflux temperature. Water distilled off azeotropically and was collected in a Barret-type receiver. After two hours the elimination of water was complete. The reaction mixture was diluted with toluene and cooled, and the precipitate collected by filtration to yield 290 g. (74%) of a dark brown product, M.P. 74–82° C. Recrystallization from ethyl acetate (500 ml.) and ethanol (30 ml.) gave the yellow-orange purified 3,5,5-trimethyl-2-cyclohexeneimine thiocyanate, 232 g. (59.5%), M.P. 90–91° C.

Analysis.—Calculated for $C_{10}H_{16}N_2S$, percent: $C=61.18$, $H=8.22$, $N=14.27$, $S=16.33$. Found, percent: $C=61.01$, $H=8.25$, $N=14.22$, $S=16.39$.

Example II

Proceeding as in Example I, but in the presence of 5.5 g. of disodium phosphate (2% based on isophorone), the mixture was refluxed for four hours, diluted with toluene and the precipitate collected by filtration to yield 354 g. (90%) of orange product, M.P. 85–90° C. Recrystallization from ethyl acetate (500 ml.) gave the yellow-orange purified 3,5,5-trimethyl-2-cyclohexeneimine thiocyanate, 318 g. (82%), M.P. 90–91° C.

Example III

Proceeding as in Example I, but in the presence of 5.5 g. (2% based on isophorone) of sodium sulphate, the mixture was refluxed for four hours, diluted with toluene, and cooled and the precipitate was collected by filtration to yield 362 g. (92%) of orange product, M.P. 84–89° C. Recrystallization from ethyl acetate (500 ml.) gave the yellow-orange purified 3,5,5-trimethyl-2-cyclohencneimine thiocyanate, 330 g. (84%).

Example IV

A mixture of 69 g. (0.5 mole) of freshly distilled isophorone, 39.9 g. (0.52 mole) of ammonium thiocyanate, 1.4 g. of trisodium phosphate and 30 ml. of toluene was placed in a 2-necked flask equipped with a mechanical stirrer and a Barret-type water separator. The mixture was stirred and refluxed until the formation of water had ceased (3 hrs.). Excess toluene was removed, the residue dissolved in chloroform and the chloroform solution filtered from the unreacted inorganic salts. After removal of the solvent, the residue (92 g.; 92%) was crystallized from ethyl acetate yielding the pure yellow product (83.5 g.; 85%) melting at 96–97° C. The same yield could be obtained using sodium chloride and sodium sulphate instead of trisodium phosphate. Without the use of sodium salts, the yield of pure produce was 57.5 g. (60%). A sample for analysis prepared by a second crystallization from ethyl acetate showed the same M.P. of 96–97° C.

*Analysis.*—Calculated for $C_{10}H_{16}N_2S$; percent: C= 61.18, H=8.22, N=14.27, S=16.33. Found, percent: C= 61.10, H=8.25, N=14.22, S=16.39.

The picrate was prepared by combining a solution in ethanol of the imine hydrothiocyanate and an ethanolic solution of picric acid. After two crystallizations from ethanol it melted at 165–166° C.

*Analysis.*—Calculated for $C_{15}H_{18}N_4O_7$; percent: C= 49.18, H=4.95, N=15.30. Found, percent: C=49.10, H=4.96, N=15.23.

Example V 3-methyl-2-cyclohexenone (22 g., 0.2 mole), ammonium thiocyanate (17 g., 0.22 mole) and 0.4 g. of disodium phosphate were heated in the presence of 100 ml. of toluene at reflux temperature. Water distilled off azeotropically and was collected in a Barret-type receiver. After 90 minutes, the elimination of water was complete. The reaction mixture was diluted with toluene and cooled, and the precipitate collected by filtration to yield 30.5 g. (91%) of crude orange product, M.P. 75–82° C. Recrystallization from ethyl acetate (100 ml.) gave purified 3-methyl-2-cyclohexeneimine thiocyanate, 27.1 g. (81%), M.P. 87–88° C.

*Analysis.*—Calculated for $C_8H_{12}N_2S$; percent: C= 57.10, H=7.19, N=16.65, S=19.06. Found, percent: C=57.07, H=7.14, N=16.58, S=19.13.

The picrate of this imine, prepared as in Example IV, melted at 168–169° C., after crystallization from ethanol.

Example VI 3,5-dimethyl-2-cyclohexenone (20 g., 0.16 mole), ammonium thiocyanate (13 g., 0.17 mole) and 0.4 g. of trisodium phosphate were heated in the presence of 50 ml. of toluene at reflux temperature. Water distilled off azeotropically and was collected in a Barret-type receiver. After two hours the elimination of water was complete. The reaction mixture was diluted with toluene and cooled, and the precipitate collected by filtration to yield 24.9 g. (85%) of orange product, M.P. 110–115° C. Recrystallization from ethyl acetate yielded purified 3,5-dimethyl-2-cyclohexeneimine thiocyanate, M.P. 115–116° C.

*Analysis.*—Calculated for $C_9H_{14}N_2S$; percent: C= 59.43, H=7.74, N=15.37, S=17.59. Found, percent: C=59.28, H=7.82, N=15.34, S=17.53.

The picrate of this imine, prepared as in Example IV, melted at 155–156° C. after crystallization from ethanol.

Example VII 3-phenyl-2-cyclohexenone (7 g., 0.04 mole), ammonium thiocyanate (3.8 g., 0.04 mole) and 0.15 g. of trisodium phosphate were heated in the presence of 50 ml. of toluene at reflux temperature. Water distilled off azeotropically and was collected in a Barret-type receiver. After 90 minutes the elimination of water was complete. The reaction mixture was diluted with toluene and cooled, and the precipitate collected by filtration to yield 8.5 g. (91%) of crude product, M.P. 125–130° C. Recrystallization from acetone (40 ml.) yielded purified 3-phenyl-2-cyclohexeneimine thiocyanate, (7.6 g. 82.5%), M.P. 134–135° C.

*Analysis.*—Calculated for $C_{13}H_{14}N_2S$; percent: C= 67.79, H=6.13, N=12.17, S=13.91. Found, percent: C=67.80, H=6.28, N=12.13, S=13.80.

The picrate of this imine, prepared as in Example IV, melted at 195–196° C. after two recrystallizations from ethanol.

Example VIII 10-methyl-octahydronaphthen(1,9)-one-2 (13 g., 0.08 mole), ammonium thiocyanate (6.8 g. 0.09 mole) and 0.2 g. of trisodium phosphate were heated in the presence of 100 ml. of toluene at reflux temperature. Water distilled off azeotropically and was collected in a Barret-type receiver. After 90 minutes the elimination of water was complete. The reaction mixture was cooled and the precipitated crude product collected by filtration. Recrystallization from ethyl acetate (150 ml.) and ethanol (10 ml.) yielded purified 10-methyl-octahydronaphthen(1,9)-imine-2-thiocyanate, 14.5 g. (82.5%), M.P. 114–116° C.

*Analysis.*—Calculated for $C_{12}H_{18}N_2S$; percent: C= 64.82, H=8.16, N=12.60, S=14.42. Found, percent: C=64.74, H=8.23, N=12.55, S=14.41.

The picrate of this imine, prepared as in Example IV, melted at 154–155° C. after two recrystallizations from ethanol.

These five new imine-thiocyanates (viz., those of Examples I–IV, V, VI, VII, and VIII respectively) all have three specific bands in the infrared spectrum (as determined with the thiocyanate in a potassium bromide disc) at $2050\pm20$ cm.$^{-1}$, at $1650\pm10$ cm.$^{-1}$ (assigned to an oleofinic double bond), and at $1610\pm20$ cm.$^{-1}$ (assigned to C=N stretching). The band of $2050\pm20$ cm.$^{-1}$ is at 2040 cm.$^{-1}$ for the compound of Examples I–IV, at 2070 cm.$^{-1}$ for the compound of Example V, 2065 cm.$^{-1}$ for the compound of Example VI, at 2075 cm.$^{-1}$ for the compound of Example VII, and at 2070 cm.$^{-1}$ for the compound of Example VIII. This band is characteristic of ionic thiocyanates.

Example IX

A wettable powder was prepared from 25 parts of 3,5,5-trimethyl-2-cyclohexeneimine thiocyanate (prepared as in Example I), 69 parts of silica, 3 parts of Marasperse N (a lignosulphonate detergent) and 3 parts of Pluronic L61 (a nonionic surface active agent prepared by the addition of ethylene oxide to a polypropylene glycol). From this wettable powder aqueous suspensions of various concentrations were made by simple mixing with water.

The herbicidal and phytotoxic properties of the thiocyanate were evaluated by applying a 2500 p.p.m. dosage to filter paper by soaking discs of the latter in a dilute dispersion of the thiocyanate suspension. Five selected seeds were then placed on the treated filter paper discs in plastic petri dishes. The number of seeds germinating and general observations on the extent of root and cotyledon damage are an index of the herbicidal potential of the thiocyanate. Phytotoxicity rating is given either in number from 0 to 10, and when applicable, by the letter I, indicating "inhibited," i.e., a substantially underdeveloped abnormal seedling. A phytotoxicity rating of 0 indicates no injury whereas a rating of 7 or higher indicates injury equivalent to chemical control for commercial purposes. The following table gives the results of a test series after five weeks' observation:

TABLE

| Seed | Oats | Cucumber | Flax | Radish | Tomatoes |
|---|---|---|---|---|---|
| Percent Seed Germination | 38 | 98 | 98 | 44 | 18 |
| Phytotoxicity Rating | 9-I | 6-I | 9 | 7 | 9–10 |

These results show the phytocidal and herbicidal activity of the new thiocyanates on certain crops, as demonstrated by the reduced germination of oats, radish and tomatoes, and by the severe phytotoxic injury to cucumber and flax. Specifically, the table shows that in the case of oats, of the 38% of the seeds which germinated, 90% of the seedlings were injured and died or were inhibited. In the case of cucumber, of the 98% of the seeds which germinated, 60% of the seedings were injured and died or were inhibited. As illustrated in the table, the thiocyanate displayed the greatest herbicidal activity in the case of tomatoes. Of the 18% of the tomato seeds which germinated, 90–100% of the seedlings were injured and died.

What is claimed is:

1. An imine thiocyanate of the formula

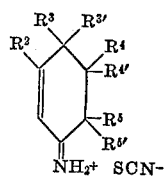

wherein $R^2$ is selected from the group consisting of methyl and phenyl; $R^3$ is hydrogen; and $R^2$ and $R^3$ together are tetramethylene; $R^{3'}$, $R^4$ and $R^{4'}$ are selected from the group consisting of hydrogen and methyl; and $R^5$ and $R^{5'}$ are hydrogen.

2. 3,5,5-trimethyl-2-cyclohexeneimine thiocyanate.
3. 3-methyl-2-cyclohexeneimine thiocyanate.
4. 3,5-dimethyl-2-cyclohexeneimine thiocyanate.
5. 3-phenyl-2-cyclohexeneimine thiocyanate.
6. 10-methyl-octahydronaphthen(1,9)-imine-2-thiocyanate.

References Cited

UNITED STATES PATENTS 2,535,922  12/1950  Haury et al. _____ 260—566

OTHER REFERENCES

Strain: Ammonolysis of Ketones, Journal of American Chemistry, vol. 52, pp. 820–823 (1930).

LEON ZITVER, *Primary Examiner.*

G. A. SCHWARTZ, *Assistant Examiner.*

U.S. Cl. X.R.

71—2.3